(12) United States Patent
Perez-Sorrosal et al.

(10) Patent No.: US 12,561,867 B2
(45) Date of Patent: Feb. 24, 2026

(54) SYSTEMS AND METHODS FOR AUTOMATICALLY ADDING TEXT CONTENT TO GENERATED IMAGES

(71) Applicant: YAHOO ASSETS LLC, New York, NY (US)

(72) Inventors: Francisco Perez-Sorrosal, Sunnyvale, CA (US); Bhavin Jawade, Buffalo, NY (US); Erfan Eshratifar, Los Angeles, CA (US); Joao Vitor Baldini Soares, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 152 days.

(21) Appl. No.: 18/512,871

(22) Filed: Nov. 17, 2023

(65) Prior Publication Data

US 2025/0166257 A1     May 22, 2025

(51) Int. Cl.
| | |
|---|---|
| *G06T 11/00* | (2006.01) |
| *G06T 11/60* | (2006.01) |
| *G06V 40/16* | (2022.01) |

(52) U.S. Cl.
CPC ............ *G06T 11/60* (2013.01); *G06V 40/161* (2022.01)

(58) Field of Classification Search
CPC .............................. G06T 11/60; G06V 40/161
USPC .......................................................... 345/629
See application file for complete search history.

(56) References Cited

U.S. PATENT DOCUMENTS

| | | | | |
|---|---|---|---|---|
| 11,756,567 B2 * | 9/2023 | Wilson | ................... | G06N 3/047 |
| | | | | 704/235 |
| 2019/0286950 A1 * | 9/2019 | Kiapour | ................ | G06F 16/532 |
| 2023/0343007 A1 * | 10/2023 | Berger | ................... | G06V 20/20 |

* cited by examiner

*Primary Examiner* — Thomas J Lett
(74) *Attorney, Agent, or Firm* — James J. DeCarlo; Greenberg Traurig, LLP

(57) ABSTRACT

In some implementations, the techniques described herein relate to a method including: (i) identifying, by a processor, a generative machine learning model trained on image data, (ii) generating, by the generative machine learning model executed by the processor, an image based on at least one parameter, (iii) editing, by an image-editing algorithm executed by the processor, the image to comprise a specified string of text in a selected area of the image, and (iv) causing display, by the processor, of the edited image.

20 Claims, 5 Drawing Sheets

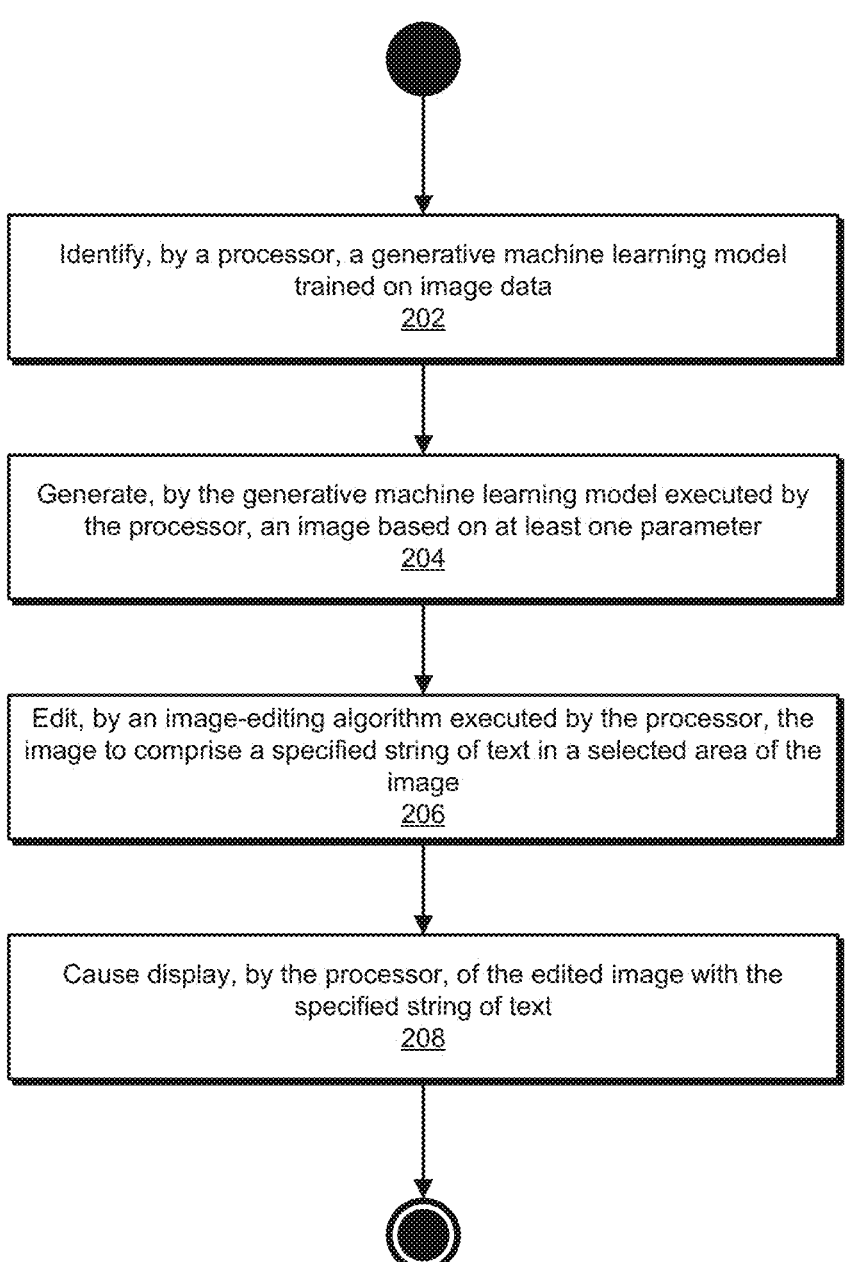

Identify, by a processor, a generative machine learning model trained on image data
202

Generate, by the generative machine learning model executed by the processor, an image based on at least one parameter
204

Edit, by an image-editing algorithm executed by the processor, the image to comprise a specified string of text in a selected area of the image
206

Cause display, by the processor, of the edited image with the specified string of text
208

*FIG. 2*

SYSTEMS AND METHODS FOR AUTOMATICALLY ADDING TEXT CONTENT TO GENERATED IMAGES

BACKGROUND

Image generation algorithms such as generative machine learning models are growing increasingly popular. Users can use these tools to create images of real or fictional places, people, or situations. In order to more efficiently cause a generative machine learning model to create images with the desired types of content, a model can be trained using specific training data. However, such models typically struggle to produce legible text in generated images. Automatically generated images with specified text can be useful in numerous contexts, from news articles to branded websites to advertisement campaigns.

BRIEF DESCRIPTION OF THE DRAWINGS

FIG. 2 is a flow diagram illustrating a method for automatically adding text content to generated images according to some of the example embodiments.

DETAILED DESCRIPTION

Figure 1:
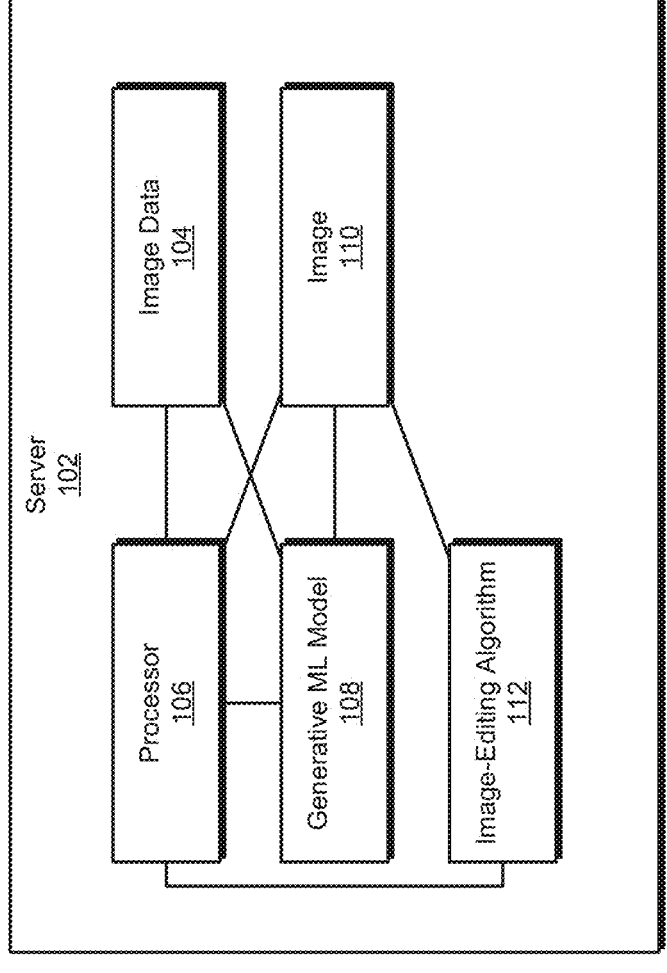
FIG. 1 is a block diagram illustrating a system for automatically adding text content to generated images according to some of the example embodiments.

The instant disclosure describes systems and methods for automatically adding text content to generated images. Various machine learning (ML) models are capable of generating images. One example of such a model is a generative ML model. Generative ML models, often underpinned by Generative Adversarial Networks (GANs) or diffusion models as well as text-based transformer models, are trained on massive datasets of images and text prompts and can be used to generate images of various sizes and styles in response to text and/or image-based prompts. Generative ML models are typically composed of a neural network with many parameters (typically billions of weights or more). For example, a generative ML model may use a GAN to analyze training data and/or image inputs. In some implementations, a generative ML model may use multiple neural networks working in conjunction.

The example embodiments herein describe methods, computer-readable media, device, and systems that automatically add text content to generated images. In some implementations, the generative ML model may be trained on data associated with an organization, such as data to which the organization has rights and/or data with organization-specific branding. In one implementation, the method may identify a legible location for text on a generated image and select a readable and attractive font face, size, and/or color for the text automatically. In some examples, the method may generate branded images for use that is internal or external to the organization.

In some implementations, the techniques described herein relate to a method including: (i) identifying, by a processor, a generative machine learning model trained on image data, (ii) generating, by the generative machine learning model executed by the processor, an image based on at least one parameter, (iii) editing, by an image-editing algorithm executed by the processor, the image to comprise a specified string of text in a selected area of the image, and (iv) causing display, by the processor, of the edited image.

In some implementations, the techniques described herein relate to a method, wherein editing, by the image-editing algorithm, the image to comprise the specified string of text comprises receiving, by the image-editing algorithm, the specified string of text and the image, identifying, by the image-editing algorithm, a legible location for the specified string of text within the image, and adding, by the image-editing algorithm, the specified string of text to the image at the legible location.

In some implementations, the techniques described herein relate to a method, wherein identifying, by the image-editing algorithm, the legible location for the specified string of text within the image comprises selecting, by the image-editing algorithm, a font size for the specified string of text.

In some implementations, the techniques described herein relate to a method, wherein identifying, by the image-editing algorithm, the legible location for the specified string of text within the image comprises selecting, by the image-editing algorithm, a font color for the specified string of text.

In some implementations, the techniques described herein relate to a method, wherein identifying, by the image-editing algorithm, the legible location for the specified string of text within the image comprises selecting, by the image-editing algorithm, a font face for the specified string of text.

In some implementations, the techniques described herein relate to a method, wherein identifying, by the image-editing algorithm, the legible location for the specified string of text within the image comprises identifying, by the image-editing algorithm, at least one visually significant element within the image and identifying the legible location that avoids the at least one visually significant element.

In some implementations, the techniques described herein relate to a method, wherein identifying the at least one visually significant element comprises using a face-detection algorithm to identify at least one face.

In some implementations, the techniques described herein relate to a method, wherein the image data is associated with an organization and causing display of the edited image comprises causing display of the edited image on a platform associated with the organization.

In some implementations, the techniques described herein relate to a non-transitory computer-readable storage medium for tangibly storing computer program instructions capable of being executed by a computer processor, the computer program instructions defining steps of: (i) identifying, by a processor, a generative machine learning model trained on image data, (ii) generating, by the generative machine learning model executed by the processor, an image based on at least one parameter, (iii) editing, by an image-editing algorithm executed by the processor, the image to comprise a specified string of text in a selected area of the image, and (iv) causing display, by the processor, of the edited image.

In some implementations, the techniques described herein relate to a non-transitory computer-readable storage medium, wherein editing, by the image-editing algorithm, the image to comprise the specified string of text comprises receiving, by the image-editing algorithm, the specified string of text and the image, identifying, by the image-editing algorithm, a legible location for the specified string of text within the image, and adding, by the image-editing algorithm, the specified string of text to the image at the legible location.

In some implementations, the techniques described herein relate to a non-transitory computer-readable storage medium, wherein identifying, by the image-editing algorithm, the legible location for the specified string of text within the image comprises selecting, by the image-editing algorithm, a font size for the specified string of text.

In some implementations, the techniques described herein relate to a non-transitory computer-readable storage medium, wherein identifying, by the image-editing algorithm, the legible location for the specified string of text within the image comprises selecting, by the image-editing algorithm, a font color for the specified string of text.

In some implementations, the techniques described herein relate to a non-transitory computer-readable storage medium, wherein identifying, by the image-editing algorithm, the legible location for the specified string of text within the image comprises selecting, by the image-editing algorithm, a font face for the specified string of text.

In some implementations, the techniques described herein relate to a non-transitory computer-readable storage medium, wherein identifying, by the image-editing algorithm, the legible location for the specified string of text within the image comprises identifying, by the image-editing algorithm, at least one visually significant element within the image and identifying the legible location that avoids the at least one visually significant element.

In some implementations, the techniques described herein relate to a non-transitory computer-readable storage medium, wherein identifying the at least one visually significant element comprises using a face-detection algorithm to identify at least one face.

In some implementations, the techniques described herein relate to a non-transitory computer-readable storage medium, wherein the image data is associated with an organization and causing display of the edited image comprises causing display of the edited image on a platform associated with the organization.

In some implementations, the techniques described herein relate to a device including: a processor; and a storage medium for tangibly storing thereon logic for execution by the processor, the logic including instructions for: (i) identifying, by the processor, a generative machine learning model trained on image data associated with an organization, (ii) generating, by the generative machine learning model executed by the processor, an image based on at least one parameter, (iii) editing, by an image-editing algorithm executed by the processor, the image to comprise a specified string of text in a selected area of the image, and (iv) causing display, by the processor, of the edited image on a platform associated with the organization.

In some implementations, the techniques described herein relate to a device, wherein editing, by the image-editing algorithm, the image to comprise the specified string of text comprises receiving, by the image-editing algorithm, the specified string of text and the image, identifying, by the image-editing algorithm, a legible location for the specified string of text within the image, and adding, by the image-editing algorithm, the specified string of text to the image at the legible location.

In some implementations, the techniques described herein relate to a device, wherein identifying, by the image-editing algorithm, the legible location for the specified string of text within the image comprises selecting, by the image-editing algorithm, a font size for the specified string of text.

In some implementations, the techniques described herein relate to a device, wherein identifying, by the image-editing algorithm, the legible location for the specified string of text within the image comprises selecting, by the image-editing algorithm, a font color for the specified string of text.

FIG. 1 is a block diagram illustrating a system for automatically adding text content to generated images according to some of the example embodiments.

The illustrated system includes a server 102. Sever 102 may be configured with a processor 106 that identifies a generative ML model 108 trained on image data 104. In some examples, generative ML model 108 may generate an image 110 based on at least one parameter and an image-editing algorithm 112 executed by processor 106 may edit image 110 to include a specified string of text in a selected location. Immediately or at a later time, processor 106 may cause display of the edited image 110. Although illustrated here on server 102, any or all of the systems described herein may be hosted by one or more servers and/or cloud-based processing resources. Additionally, or alternatively, any or all of the systems described herein may be hosted on a client device (e.g., an endpoint computing device). Further details of these components are described herein and in the following flow diagrams.

In the various implementations, server 102, processor 106, and generative ML model 108, and/or image-editing algorithm 112 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some or all of the methods described in FIG. 2 and FIG. 4.

In some implementations, image data 104 can include various types of digital images in different formats and/or file types. In some examples, image data 104 may include image data associated with an organization. For example, image data 104 may include branded images such as logos and/or trademarks for an organization. In one example, image data 104 may include images for which an organization owns and/or has licensed the usage rights. Additionally, or alternatively, image data 104 may include public domain images.

Image-editing algorithm 112 generally refers to any type or form of software module, process, model, and/or algorithm that is capable of determining the placement of a predetermined string of text onto an image without direct user input as to the placement. In one implementation, image-editing algorithm may include an ML model. In some implementations, image-editing algorithm 112 may receive text style information such as font face, color, and/or size as input while in other implementations, image-editing algorithm 112 may automatically determine text style.

Image 110 generally represents any type or form of image generated by a generative ML model. In some examples, image 110 may be a static image. In one example, image 110 may include an animation.

FIG. 2 is a flow diagram illustrating a method for automatically adding text content to generated images according to some of the example embodiments.

In step 202, the method can include identifying, by a processor, a generative ML model trained on image data.

In some implementations, the generative ML model may be an off-the-shelf (e.g., free to use or licensed) ML model trained with the organization's custom data. For example, the method may train the generative ML model with data for which the organization has the rights, such as image data owned by or licensed by the organization and/or public domain data. In some examples, the method may train the generative ML model with branded data for the organization, such as logos, trademarks, product images, and the like.

Figure 3:
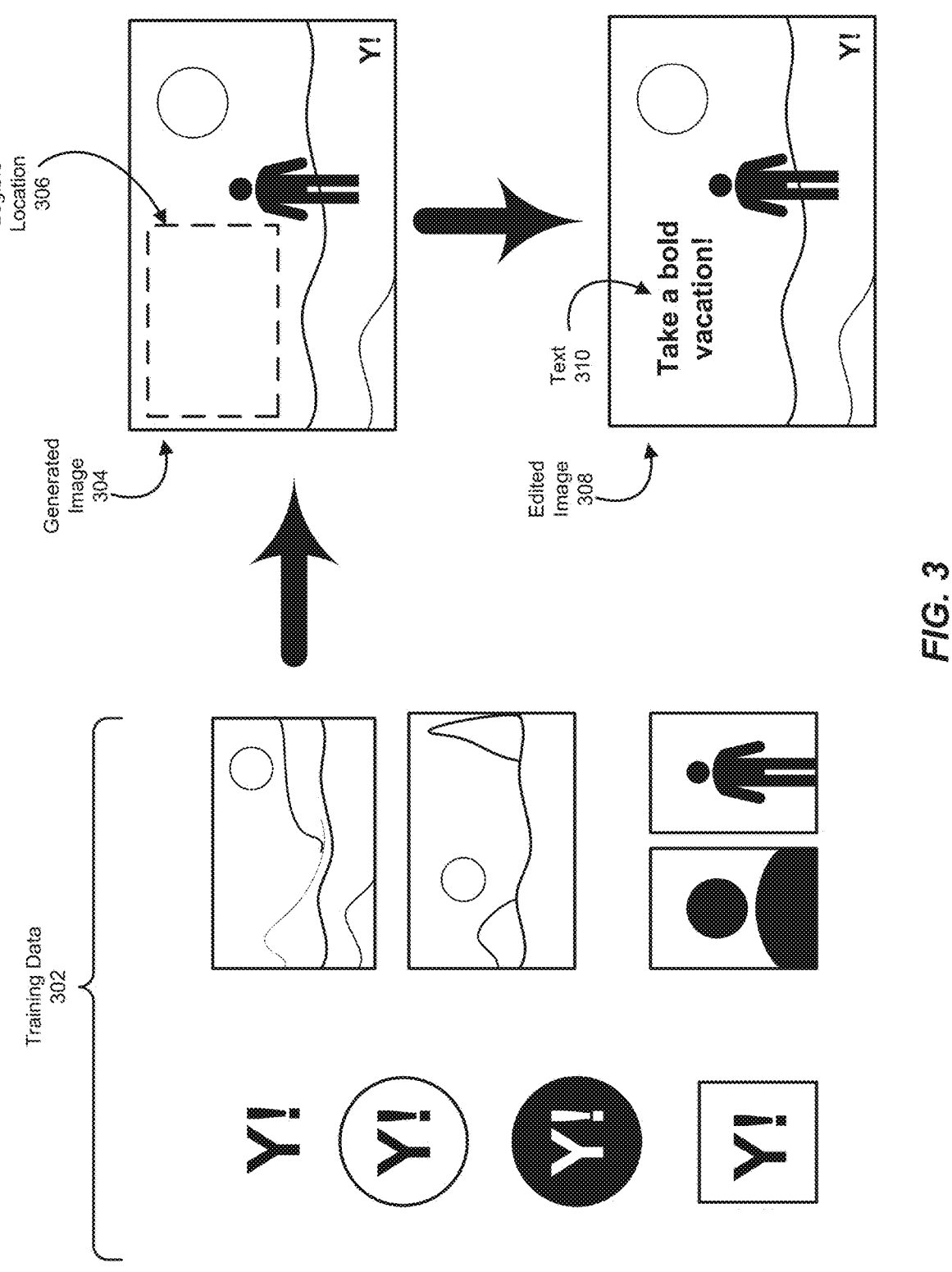
FIG. 3 is an illustration of a method for automatically adding text content to generated images according to some of the example embodiments.

For example, as illustrated in FIG. 3, training data 302 may include various types of images such as brand logos, landscape images, and/or images of people. By training the generative ML model on data owned and/or usable by the organization, the method may avoid potential legal issues around generated images based on data of uncertain provenance. Additionally, by training the generative ML model on branded data, the method may enable the generated ML model to create images with the organization's branding, increasing the efficiency of image generation for branded platforms, advertisement campaigns, and the like.

Returning to FIG. 2, in step 204, the method can include generating, by the generative ML model executed by the processor, an image based on at least one parameter.

The method may receive the parameter in a variety of ways. For example, the method may receive the parameter as user input. In another example, the method may receive the parameter from another software process. In some examples, the parameter may include a structured prompt for the generative ML model. In other examples, the parameter may not include a prompt and the systems described herein may generate a prompt based on the parameter (e.g., via a large language model [LLM]) and provide the prompt to the generative ML model.

For example, the systems described herein may include a chat interface (e.g., powered by an LLM) that may receive natural language text from and may transform that natural language text into a structured prompt.

Example natural language text: Generate a desert landscape with a person in it and a Yahoo! logo.

Example prompt: Desert landscape, outdoors, sand, desert plants, daylight, photo, landscape photo, travel photo, person, tourist, Yahoo! logo, Yahoo! branding, realistic, high definition.

In step 206, the method can include editing, by an image-editing algorithm executed by the processor, the image to comprise a specified string of text in a selected area of the image.

In some implementations, the method may include training the image-editing algorithm before executing the image-editing algorithm to add the specified string of text to the image. For example, the method may train the image-editing algorithm with triplets that consist of an input image with no text, a string of text, and the input image with the string of text added. In some implementations, the method may generate these triplets (e.g., via combination of generative ML models and/or LLMs) while in other examples, the method may receive a library of triplets. In one implementation, the method may generate triplets by performing optical character recognition on an image with text to identify the string of text and then creating a version of the image without the text (e.g., via inpainting) to serve as the input image. In one version of this implementation, the method may perform inpainting on other arbitrary areas of the image to reduce the probability of inadvertently training the image-editing algorithm to add text to areas of images that have characteristics of inpainting (e.g., color or texture inconsistencies).

In some implementations, the method may train the image-editing algorithm to receive preferred text location information as input. For example, the preferred text location information may be in the form of pixel coordinates and/or in the form of a separate image that designates the location via some characteristic (e.g., masking the area of the preferred text location with pixels of a specified color). In one implementation, the method may train a model to create images that designate a preferred text location using similar techniques to those described above for training an image-editing algorithm.

In one implementation, the image-editing algorithms may include feature maps and latents from pretrained models and/or unsupervised or self-supervised models. In some implementation, the image-editing algorithm may include a model from which a saliency map (e.g., that highlights a visually significant region in the image) could be extracted to determine location of a salient object.

In some implementations, the image-editing algorithm may automatically identify a legible location on the generated image in which to place the text. For example, as illustrated in FIG. 3, a generative ML model trained on training data 302 may produce a generated image 304. In one example, an image-editing algorithm may analyze generated image 304 and identify a legible location 306. In this example, legible location 306 may be an empty area of sky that does not include the person, the logo, or any high-contrast areas such as the horizon or the sun. The image-editing algorithm may then place text 310 in legible location 306, resulting in edited image 308.

Figure 4:
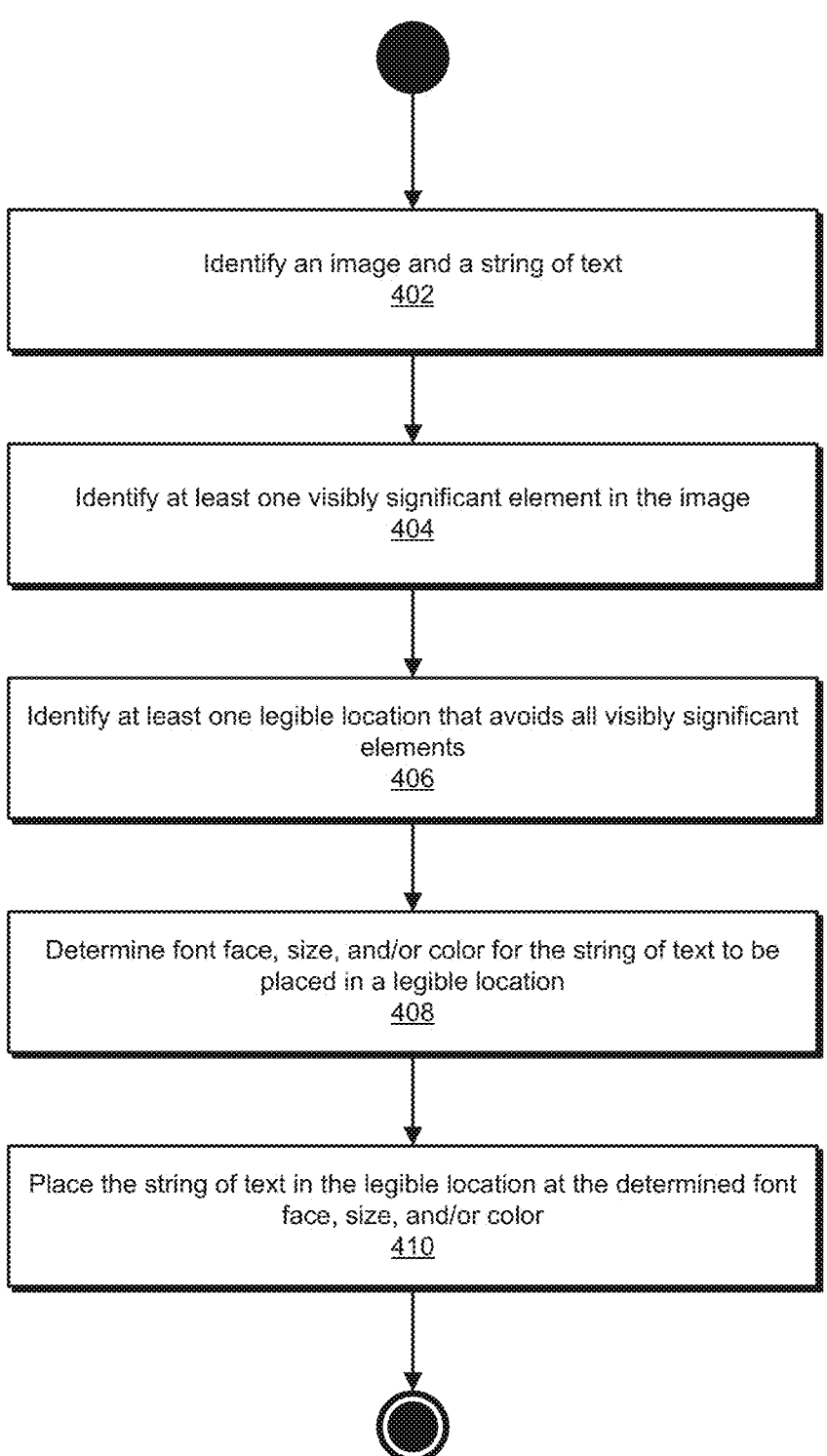
FIG. 4 is a flow diagram illustrating a method automatically adding text content to generated images according to some of the example embodiments.

The image-editing algorithm may identify a legible location and place text within the legible location in a variety of ways. For example, as illustrated in FIG. 4, in step 402, the image-editing algorithm may identify an image and a string of text. In some examples, the systems described herein may receive the string of text as input from a user and/or a software process. For example, a user may provide the string of text as input to a chat interface. In another example, the systems described herein may receive the string of text from a process that automatically provides input to the systems described herein to generate a batch of images with text (e.g., for an advertisement campaign). In one implementation, the systems described herein may receive the string of text as output from an LLM.

In step 404, the image-editing algorithm may identify at least one visibly significant element in the image. The image-editing algorithm may identify visibly significant elements in a variety of ways. For example, the image-editing algorithm may use a facial recognition algorithm to identify faces. In some examples, the image-editing algorithm may use optical character recognition to identify text in the image. Additionally, or alternatively, the image-editing algorithm may analyze characteristics of groups of pixels such as hue, saturation, and/or value to identify visibly significant elements. For example, the image-editing algorithm may determine that a horizon is a visibly significant element due to the high contrast between the ground and the sky. In another example, the image-editing algorithm may determine that regions with a lot of edges and/or strong textures are visibly significant elements due to the difficulty of reading text placed on such areas. The image-editing algorithm may detect these types of regions by using several methods, including edge detection, detection of high frequencies, and/or a dedicated trained model.

In step 406, the image-editing algorithm may identify at least one legible location that avoids all visibly significant elements. For example, the image-editing algorithm may identify an empty area of background, sky, wall, or the like. In some examples, the image-editing algorithm may identify multiple legible locations in some image. In some implementations, the image-editing algorithm may have a minimum size for legible locations (e.g., as a hard-coded minimum, as a variable minimum based on the number of characters in the string of text, etc.) in terms of pixels, percentage of image size, and/or print size.

In step 408, the image-editing algorithm may determine a font face, size, and/or color of the string of text to be placed in the legible location. In some implementations, the image-editing algorithm may receive font information as input. Additionally, or alternatively, the image-editing algorithm may automatically determine font information based at least in part on the image and/or the text. For example, the image-editing algorithm may determine that text placed on a light background should be a dark color or vice versa. In one implementation, the image-editing algorithm may sample colors from other parts of the image and select a font color that matches the color palette of the image. Additionally, or alternatively, the image-editing algorithm may have a predetermined list of brand identity colors for text and may determine which color from the list is most appropriate for the image (e.g., based on the other colors in the image, the background where the text will be placed, etc.).

In some examples, the image-editing algorithm may select a font size that maximizes the visibility of the text given the size of the legible location. In one implementation, the image-editing algorithm may choose a font face based at least in part on characteristics of the image. For example, the image-editing algorithm may choose a blockier, more readable font for an image where the legible area includes pixels of several colors and a more stylized font for an image where the legible area is a uniform color that provides ideal contrast for the text. Additionally, or alternatively, the image-editing algorithm may determine the font face based at least in part on the string of text. For example, the image-editing algorithm may choose a blockier font for a longer string of text and a more stylized font for a shorter string of text. In some implementations, the image-editing algorithm may receive font hints from an LLM based on the content of the text. For example, an LLM may analyze the text string "take a bold vacation!" and suggest a blocky print font while suggesting a cursive font for the text string, "have a flowery spring." Additionally, or alternatively, the image-editing algorithm may select an opacity of the text. For example, the algorithm may select a high opacity for text on a background with higher contrast and a lower opacity on a background with lower contrast. In one implementation, the image-editing algorithm may predict a font mask to crop the text to fit around one or more elements and/or boundaries of the image. For example, the image-editing algorithm may crop trailing elements at the bottom of text in a stylized font in order to fit above a visually significant element in the image.

In step 410, the image-editing algorithm may place the string of text in the legible location at the determined font face, size, and/or color. In one implementation, the image-editing algorithm may intelligently break up long strings of text (e.g., at word boundaries) into multiple lines to fit within the legible location. In some implementations, if there are multiple legible locations in the image, the image-editing algorithm may output multiple versions of the edited image with the string of text in different locations. Additionally, or alternatively, the image-editing algorithm may output multiple versions of the edit image with different font faces, sizes, and/or colors for the text.

Returning to FIG. 2, in step 208, the method can include causing display, by the processor, of the edited image.

The processor may cause display of the edited image in a variety of ways and on a variety of types of platforms. For example, the processor may transmit the image from a server to an endpoint device (e.g., a personal computing device such as a laptop, desktop, or mobile phone) for display on a screen of the endpoint device.

In some examples, the platform may be associated with the organization that is associated with the image data used to train the ML model. In some examples, the processor may cause the image to be displayed on an internal platform operated by the organization, such as a platform for creating images for display elsewhere, a platform for managing advertisement campaigns, and/or a private intranet platform. In other examples, the processor may cause the image to be displayed on an external platform operated by the organization, such as the organization's public-facing website and/or application. In some examples, the processor may cause the image to be displayed on a platform that is associated with but not operated by the organization, such as a third-party website or application that is displaying advertisements purchased by the organization.

In some embodiments, the systems described herein may perform the methods described above on multiple versions of an image consecutively and/or concurrently. For example, the generative ML model may generate versions of an image of different aspect ratios and/or resolutions and the image-editing algorithm may place the same string of text or similar strings of text (e.g., a full version and an abbreviated version of a string of text) on each version of the image in an appropriate place and at an appropriate size for that version of the image. For example, the systems described herein may generate a high-resolution landscape-format image of a beach landscape with the text "This summer, take a bold vacation!" across the sand and a lower-resolution portrait-format version of the same landscape with the text, "A bold vacation!" in the sky.

In some embodiments, the systems described herein may perform any or all of the above steps on a pre-existing image rather than a generated image. For example, the systems described herein may retrieve an image from a database or receive an image from a user and the image-editing algorithm may place text on the image.

Figure 5:
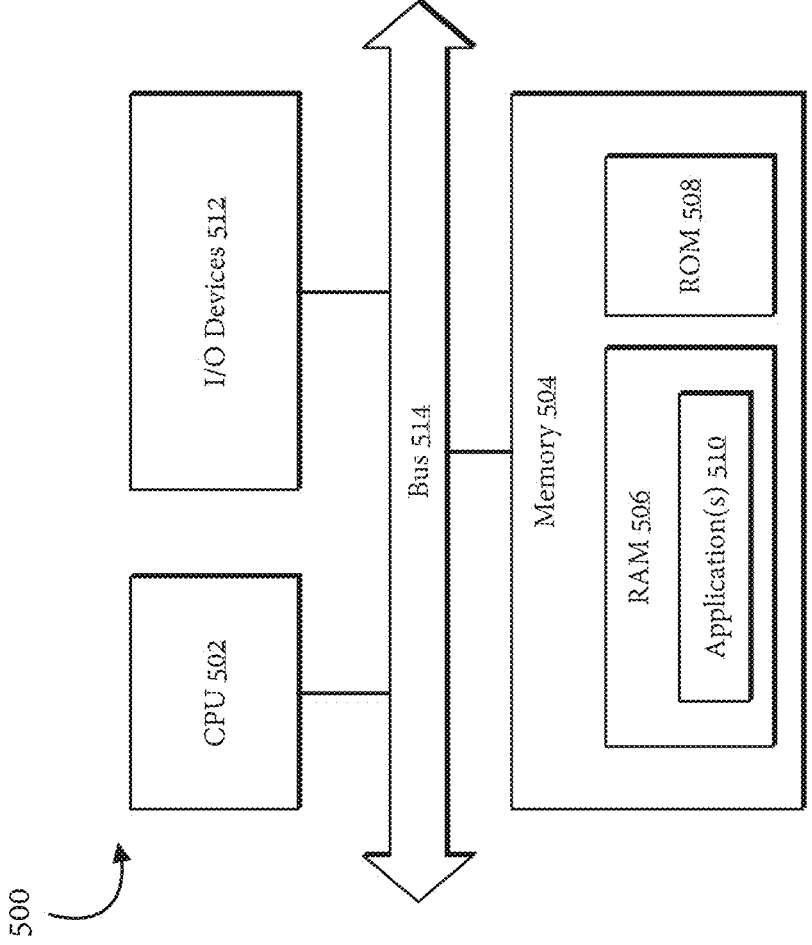
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU)

devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

identifying, by a processor, a generative machine learning model trained on image data, wherein the generative machine learning model comprises one of a generative adversarial network (GAN) or a diffusion model configured to synthesize new images from training data;

generating, by the generative machine learning model executed by the processor, an image based on at least one parameter, wherein the synthesized image is created by the generative machine learning model without capturing real-world objects;

determining, by the processor, that the image lacks readable text content;

editing, by an image-editing algorithm executed by the processor, the image to comprise a specified string of text in a selected area of the image; and causing display, by the processor, of the edited image with the specified string of text.

2. The method of claim 1, wherein editing, by the image-editing algorithm, the image to comprise the specified string of text comprises:

receiving, by the image-editing algorithm, the specified string of text and the image;

identifying, by the image-editing algorithm, a legible location for the specified string of text within the image; and adding, by the image-editing algorithm, the specified string of text to the image at the legible location.

3. The method of claim 2, wherein identifying, by the image-editing algorithm, the legible location for the specified string of text within the image comprises selecting, by the image-editing algorithm, a font size for the specified string of text.

4. The method of claim 2, wherein identifying, by the image-editing algorithm, the legible location for the specified string of text within the image comprises selecting, by the image-editing algorithm, a font color for the specified string of text.

5. The method of claim 2, wherein identifying, by the image-editing algorithm, the legible location for the specified string of text within the image comprises selecting, by the image-editing algorithm, a font face for the specified string of text.

6. The method of claim 2, wherein identifying, by the image-editing algorithm, the legible location for the specified string of text within the image comprises:

identifying, by the image-editing algorithm, at least one visually significant element within the image; and identifying the legible location that avoids the at least one visually significant element.

7. The method of claim 6, wherein identifying the at least one visually significant element comprises using a face-detection algorithm to identify at least one face.

8. The method of claim 1, wherein the image data is associated with an organization and causing display of the edited image comprises causing display of the edited image on a platform associated with the organization.

9. A non-transitory computer-readable storage medium for tangibly storing computer program instructions capable of being executed by a computer processor, the computer program instructions defining steps of:

identifying, by a processor, a generative machine learning model trained on image data, wherein the generative machine learning model comprises one of a generative adversarial network (GAN) or a diffusion model configured to synthesize new images from training data;

generating, by the generative machine learning model executed by the processor, an image based on at least one parameter, wherein the synthesized image is created by the generative machine learning model without capturing real-world objects;

determining, by the processor, that the image lacks readable text content;

editing, by an image-editing algorithm executed by the processor, the image to comprise a specified string of text in a selected area of the image; and causing display, by the processor, of the edited image.

10. The non-transitory computer-readable storage medium of claim 9, wherein editing, by the image-editing algorithm, the image to comprise the specified string of text comprises:

receiving, by the image-editing algorithm, the specified string of text and the image;

identifying, by the image-editing algorithm, a legible location for the specified string of text within the image; and adding, by the image-editing algorithm, the specified string of text to the image at the legible location.

11. The non-transitory computer-readable storage medium of claim 10, wherein identifying, by the image-editing algorithm, the legible location for the specified string of text within the image comprises selecting, by the image-editing algorithm, a font size for the specified string of text.

12. The non-transitory computer-readable storage medium of claim 10, wherein identifying, by the image-editing algorithm, the legible location for the specified string of text within the image comprises selecting, by the image-editing algorithm, a font color for the specified string of text.

13. The non-transitory computer-readable storage medium of claim 10, wherein identifying, by the image-editing algorithm, the legible location for the specified string of text within the image comprises selecting, by the image-editing algorithm, a font face for the specified string of text.

14. The non-transitory computer-readable storage medium of claim 10, wherein identifying, by the image-editing algorithm, the legible location for the specified string of text within the image comprises:

identifying, by the image-editing algorithm, at least one visually significant element within the image; and identifying the legible location that avoids the at least one visually significant element.

15. The non-transitory computer-readable storage medium of claim 14, wherein identifying the at least one visually significant element comprises using a face-detection algorithm to identify at least one face.

16. The non-transitory computer-readable storage medium of claim 9, wherein the image data is associated with an organization and causing display of the edited image comprises causing display of the edited image on a platform associated with the organization.

17. A device comprising:

a processor; and a storage medium for tangibly storing thereon logic for execution by the processor, the logic comprising instructions for:

identifying, by the processor, a generative machine learning model trained on image data associated with an organization, wherein the generative machine learning model comprises one of a generative adversarial network (GAN) or a diffusion model configured to synthesize new images from training data;

generating, by the generative machine learning model executed by the processor, an image based on at least one parameter, wherein the synthesized image is created by the generative machine learning model without capturing real-world objects;

determining, by the processor, that the image lacks readable text content;

editing, by an image-editing algorithm executed by the processor, the image to comprise a specified string of text in a selected area of the image; and causing display, by the processor, of the edited image on a platform associated with the organization.

18. The device of claim 17, wherein editing, by the image-editing algorithm, the image to comprise the specified string of text comprises:

receiving, by the image-editing algorithm, the specified string of text and the image;

identifying, by the image-editing algorithm, a legible location for the specified string of text within the image; and adding, by the image-editing algorithm, the specified string of text to the image at the legible location.

19. The device of claim 18, wherein identifying, by the image-editing algorithm, the legible location for the specified string of text within the image comprises selecting, by the image-editing algorithm, a font size for the specified string of text.

20. The device of claim 18, wherein identifying, by the image-editing algorithm, the legible location for the specified string of text within the image comprises selecting, by the image-editing algorithm, a font color for the specified string of text.

*     *     *     *     *